(12) United States Patent
Wang et al.

(10) Patent No.: US 9,838,704 B2
(45) Date of Patent: Dec. 5, 2017

(54) METHOD AND APPARATUS FOR DECODING VIDEO

(71) Applicants: BOE TECHNOLOGY GROUP CO., LTD., Beijing (CN); BEIJING BOE DISPLAY TECHNOLOGY CO., LTD., Beijing (CN)

(72) Inventors: Jianming Wang, Beijing (CN); Zhiming Meng, Beijing (CN); Zongze He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 322 days.

(21) Appl. No.: 14/436,757

(22) PCT Filed: Aug. 29, 2014

(86) PCT No.: PCT/CN2014/085522
§ 371 (c)(1),
(2) Date: Apr. 17, 2015

(87) PCT Pub. No.: WO2015/131511
PCT Pub. Date: Sep. 11, 2015

(65) Prior Publication Data
US 2016/0173899 A1    Jun. 16, 2016

(30) Foreign Application Priority Data
Mar. 6, 2014 (CN) .......................... 2014 1 0081093

(51) Int. Cl.
*H04B 1/66* (2006.01)
*H04N 19/44* (2014.01)
(Continued)

(52) U.S. Cl.
CPC ........... *H04N 19/44* (2014.11); *H04N 19/436* (2014.11); *H04N 19/625* (2014.11); *H04N 19/86* (2014.11)

(58) Field of Classification Search
CPC ..................................................... G06F 17/16
See application file for complete search history.

(56) References Cited

U.S. PATENT DOCUMENTS

| 5,345,408 A * | 9/1994 | Hoogenboom ....... G06F 17/147 708/402 |
| 6,477,203 B1 * | 11/2002 | Poplin ..................... G06F 17/16 375/240.2 |

FOREIGN PATENT DOCUMENTS

| CN | 1253340 A | 5/2000 |
| CN | 1553707 A | 12/2004 |

(Continued)

OTHER PUBLICATIONS

Second Chinese Office Action dated Feb. 28, 2017; Appln. No. 201410081093.5.
First Chinese Office Action dated Sep. 1, 2016; Appln. No. 201410081093.5.
(Continued)

*Primary Examiner* — Sath V Perungavoor
*Assistant Examiner* — Peet Dhillon
(74) *Attorney, Agent, or Firm* — Ladas & Parry LLP (57) ABSTRACT

Embodiments of the present application provide a method for decoding a video and an apparatus for decoding a video, which increases accuracy of data processing while simplifying a micro architecture design of inverse discrete cosine transform in video decoding process. The method comprises: storing received data to be decoded in a plurality of first data registers and a plurality of second data registers that are spaced with each other in sequence; performing shift and look-up table processing on the data to be decoded that is stored in the first data registers and the second data register, to obtain a look-up table result corresponding to a (Continued)

first coefficient matrix and a look-up table result corresponding to a second coefficient matrix respectively; performing a distributed computing on the look-up table result corresponding to the first coefficient matrix and the look-up table result corresponding to the second coefficient matrix, to obtain decoded data.

10 Claims, 5 Drawing Sheets

(51) Int. Cl.
*H04N 19/625* (2014.01)
*H04N 19/436* (2014.01)
*H04N 19/86* (2014.01)

(56) References Cited

FOREIGN PATENT DOCUMENTS

| | | |
|---|---|---|
| CN | 101790094 A | 7/2010 |
| CN | 202084032 A | 12/2011 |
| CN | 103945226 A | 7/2014 |
| JP | 2002-185964 A | 6/2002 |

OTHER PUBLICATIONS

International Search Report dated Dec. 8, 2014; PCT/CN2014/085522.
Written Opinion of the International Searching Authority dated Dec. 8, 2014; PCT/CN2014/085522.

* cited by examiner

METHOD AND APPARATUS FOR DECODING VIDEO

TECHNICAL FIELD

The present application relates to a field of computer technique, in particular to a method for decoding a video and an apparatus for decoding a video.

BACKGROUND

Inverse discrete cosine transform (IDCT) is widely applied in decoding of video data. When a terminal user views a video program, a decoder in a display apparatus will decode encoded data of the video program by adopting the inverse discrete cosine transform algorithm, so that the video program is able to be displayed on a display panel.

In existing video decoding process, a relatively complicated decoding algorithm can be set to obtain an image having a clear picture and a high quality of display effect. However, the relatively complicated decoding algorithm would reduce efficiency of decoding process, so as to affect response speed of picture display in the process of viewing. In addition, when the decoding algorithm is simplified to improve decoding performance, accuracy of decoding process and precision of decoding output data will be decreased. For example, data loss will occur in decoding output data, thereby causing that the difference between display areas having different gray scale values increases. Accordingly, softness of the display picture decreases and a disadvantageous influence will be made on viewing.

SUMMARY

Embodiments of the present application provides a method for decoding a video and an apparatus for decoding a video, which increases accuracy of data processing while simplifying a micro architecture design of inverse discrete cosine transform in video decoding process.

In order to achieve the above purpose, the embodiments of the present application adopt technical solutions as below.

A first aspect of the embodiment of the present application provides a method for decoding a video. The method for decoding the video comprises: storing received data to be decoded in a data register in sequence, the data register including a plurality of first data registers and a plurality of second data registers that are spaced with each other; performing shift and look-up table processing on the data to be decoded that is stored in the first data registers, to obtain a look-up table result corresponding to a first coefficient matrix; performing a shift and look-up table processing on the data to be decoded that is stored in the second data registers, to obtain a look-up table result corresponding to a second coefficient matrix; and performing a distributed computing on the look-up table result corresponding to the first coefficient matrix and the look-up table result corresponding to the second coefficient matrix, to obtain decoded data.

A second aspect of the embodiment of the present application provides an apparatus for decoding a video. The apparatus for decoding a video comprises a data register, a shift control module and a merging module. The data register is configured to store received data to be decoded in sequence, the data register including a plurality of first data registers and a plurality of second data registers that are spaced with each other. The shift control module is configured to perform shift and look-up table processing on the data to be decoded that is stored in the first data registers or the data to be decoded that is stored in the second data registers, to obtain a look-up table result corresponding to a first coefficient matrix or a look-up table result corresponding to a second coefficient matrix. The merging module is configured to perform a distributed computing on the look-up table result corresponding to the first coefficient matrix and the look-up table result corresponding to the second coefficient matrix, to obtain decoded data.

In the technical solutions of the method and the apparatus for decoding a video according to the embodiment of the present application, the received data to be decoded are in sequence stored in a plurality of first data registers and a plurality of second data registers that are spaced with each other, shift and look-up table processing are performed on the data to be decoded that is stored in the first data registers and the second data registers, a look-up table result corresponding to a first coefficient matrix or a look-up table result corresponding to a second coefficient matrix are obtained respectively, and distributed computing are performed on the look-up table result corresponding to the first coefficient matrix and the look-up table result corresponding to the second coefficient matrix to obtain decoded data. Correspondingly, a plurality of first data registers and a plurality of second data registers that are spaced with each other are arranged to perform segmentation processing on the received data to be decoded, and thus the micro architecture of the video decoding algorithm can be simplified, so as to guarantee high efficiency of decoding process while not reducing accuracy of data processing.

BRIEF DESCRIPTION OF THE DRAWINGS

In order to more clearly describe the technical solutions in the embodiment of the present application or in the prior art, figures needed to be used in describing the embodiment or the prior art will be simply introduced below. Obviously, the figures in below descriptions are just some embodiments of the present application. Other figures can further be obtained according to these figures without paying any inventive labor for those skilled in the art.

DETAILED DESCRIPTION

The technical solutions in embodiments of the present application will be clearly and completely described by combining with the figures in the embodiments of the present application. Obviously, the embodiments described below are just a part of embodiments of the present application, but not all the embodiments of the present application. Based on the embodiments of the present application, all the other embodiments obtained by those skilled in the art without paying any inventive labor fall within the scope sought for protection by the present application.

It needs to note that a method of inverse discrete cosine transform can generally be adopted to perform a decoding algorithm on a video. For example, an inverse discrete cosine transform of one dimensional 8×8 can be adopted for one time, which can be described as a matrix multiplication of one 8×8 and is in particular as follow:

$$\begin{bmatrix} y0 \\ y1 \\ y2 \\ y3 \\ y4 \\ y5 \\ y6 \\ y7 \end{bmatrix} = \begin{bmatrix} a & b & c & d & a & e & f & g \\ a & d & f & -g & -a & -b & -c & -e \\ a & e & -f & -b & -a & g & c & b \\ a & g & -c & -e & a & d & -f & -b \\ a & -g & -c & e & a & -d & -f & b \\ a & -e & -f & b & -a & -g & c & -b \\ a & -d & f & g & -a & b & -c & e \\ a & -b & c & -d & a & -e & f & -g \end{bmatrix} \begin{bmatrix} x0 \\ x1 \\ x2 \\ x3 \\ x4 \\ x5 \\ x6 \\ x7 \end{bmatrix}$$

The above 8×8 multiplication matrix can be equivalently transformed into arithmetic operation between two 4×4 matrixes and two 4×1 matrixes:

$$\begin{bmatrix} y0 \\ y1 \\ y2 \\ y3 \end{bmatrix} = \begin{bmatrix} a & c & a & f \\ a & f & -a & -c \\ a & -f & -a & c \\ a & -c & a & -f \end{bmatrix} \begin{bmatrix} x0 \\ x2 \\ x4 \\ x6 \end{bmatrix} + \begin{bmatrix} b & d & e & g \\ d & -g & -b & -e \\ e & -b & g & b \\ g & -e & d & -b \end{bmatrix} \begin{bmatrix} x1 \\ x3 \\ x5 \\ x7 \end{bmatrix}$$

$$\begin{bmatrix} y7 \\ y6 \\ y5 \\ y4 \end{bmatrix} = \begin{bmatrix} a & c & a & f \\ a & f & -a & -c \\ a & -f & -a & c \\ a & -c & a & -f \end{bmatrix} \begin{bmatrix} x0 \\ x2 \\ x4 \\ x6 \end{bmatrix} - \begin{bmatrix} b & d & e & g \\ d & -g & -b & -e \\ e & -b & g & b \\ g & -e & d & -b \end{bmatrix} \begin{bmatrix} x1 \\ x3 \\ x5 \\ x7 \end{bmatrix}$$

wherein, 4×4 matrixes of even columns are composed of rows 0-3 in columns 0, 2, 4, 6 of 8×8 matrixes, and 4×4 matrixes of odd columns are composed of rows 0-3 in columns 1, 3, 5, 7 of 8×8 matrixes.

In particular, the two 4×4 matrixes are particularly as follows:

$$P = \begin{bmatrix} a & c & a & f \\ a & f & -a & -c \\ a & -f & -a & c \\ a & -c & a & -f \end{bmatrix};$$

$$Q = \begin{bmatrix} b & d & e & g \\ d & -g & -b & -e \\ e & -b & g & b \\ g & -e & d & -b \end{bmatrix}$$

wherein $$(a\ b\ c\ d\ e\ f\ g)^T = \frac{1}{2}\left(\cos\frac{\pi}{4}\cos\frac{\pi}{16}\cos\frac{\pi}{8}\cos\frac{3\pi}{16}\cos\frac{5\pi}{16}\cos\frac{3\pi}{8}\cos\frac{7\pi}{16}\cos\frac{\pi}{4}\right)^T$$

in addition, $$Y1 = (y0\ y1\ y2\ y3)^T\ Y2 = (y7\ y6\ y5\ y4)^T$$

$$X1 = (x0\ x2\ x4\ x6)^T\ X2 = (x1\ x3\ x5\ x7)^T$$

In this way, the one-dimensional inverse discrete cosine transform can be represented by the following formula:

$$Y1 = PX1 + QX2;\ Y2 = PX1 - QX2$$

i.e., $$\begin{pmatrix} Y1 \\ Y2 \end{pmatrix} = IDCT\begin{pmatrix} X1 \\ X2 \end{pmatrix}$$

Figure 1:
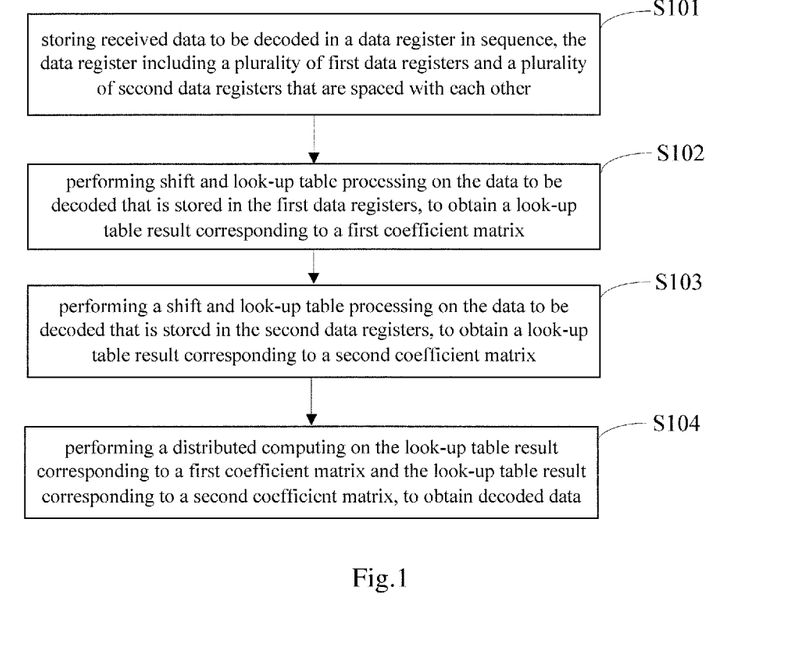
FIG. 1 is a flow chart of a method for decoding a video provided in an embodiment of the present application.

The embodiment of the present application provides a method for decoding a video. As shown in FIG. 1, the method for decoding a video comprises steps S101-S104.

Figure 2:
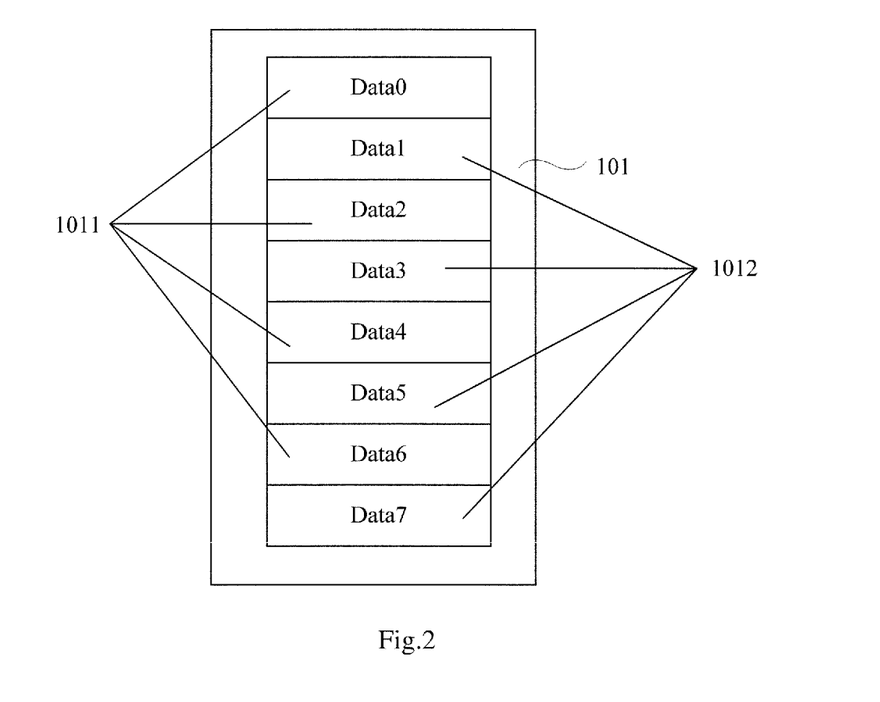
FIG. 2 is a schematic diagram of a structure of a data register provided in an embodiment of the present application.

S101: storing received data to be decoded (x0, x1 . . . x7) in a data register 101 in sequence (as shown in FIG. 2). The data register 101 includes a plurality of first data registers 1011 (Date0, Date2, Date4, Date6) and a plurality of second data registers 1012 (Date1, Date3, Date5, Date7) that are spaced with each other. Eight clock cycles are used to store the data to be decoded (x0, x1 . . . x7) in the first data registers 1011 (Date0, Date2, Date4, Date6) and the second data registers 1012 (Date1, Date3, Date5, Date7). Since in the following formulas of Y1=PX1+QX2 and Y2=PX1−QX2, there are same operation unit modes, i.e., 4×1 matrix PX1 and 4×1 matrix QX2. Therefore, segmentation processing can be performed on the received data to be decoded (x0, x1 . . . x7) by arranging a plurality of first data registers 1011 (Date0, Date2, Date4, Date6) and a plurality of second data registers 1012 (Date1, Date3, Date5, Date7) that are spaced with each other, so as to calculate the above 4×1 matrix PX1 and 4×1 matrix QX2 through subsequent steps, and then calculate Y1 and Y2 by addition and subtraction operations, so as to simplify the above inverse discrete cosine transform method. Of course, the above division of the data registers 101 is just for illustration, and there may be other division modes. For example, the data registers 101 may be divided into a plurality of registers in four types, for example, first data registers (Date0, Date2), second data registers (Date4, Date6), third data registers (Date1, Date3) and fourth data registers (Date5, Date7). Those skilled in the art can divide the data registers 101 according to the actual requirement for computing efficiency and computing accuracy. Other kind of division in the embodiment of the present application is not described in detail herein.

S102: performing shift and look-up table processing on the data to be decoded (matrix (x0 x2 x4 x6)$^T$ composed of x0, x2, x4, x6) that is stored in the first data registers 1011 (Date0, Date2, Date4, Date6), to obtain a look-up table result PX1 corresponding to a first coefficient matrix P.

S103: performing shift and look-up table processing on the data to be decoded (matrix $(x1\ x3\ x5\ x7)^T$ composed of x1, x3, x5, x7) that is stored in the second data registers 1012 (Date1, Date3, Date5, Date7), to obtain a look-up table result QX2 corresponding to a second coefficient matrix Q.

It needs to note that the above steps S102 and S103 is in no particular order, and can be performed simultaneously.

In particular, the above shift and look-up table processing is described as follows.

Addressing of looking up table are performed by taking $(x0\ x2\ x4\ x6)^T$ or $(x1\ x3\ x5\ x7)^T$ as an address index value, and each row of the first coefficient matrix P or the second coefficient matrix Q are stored so as to obtain the look-up table result PX1 corresponding to the first coefficient matrix P or the look-up table result QX2 corresponding to the second coefficient matrix Q. Each row of the first coefficient matrix P and second coefficient matrix Q corresponds to an intermediate value. For example, the first row of the first coefficient matrix P corresponds to the intermediate value y0, and the first row of the second coefficient matrix Q corresponds to the intermediate value y1. The correspondence relationship of other rows is by analogy.

Preferably, numeric (a, b, c, d, e, f, g) in the first coefficient matrix P or the second coefficient matrix Q is set as a signed number having 8 bits. The most significant bit of the signed number having 8 bits is the sign bit.

In a specific shift and look-up table processing, preferably, the data to be decoded (for example, the matrix $(x0\ x2\ x4\ x6)^T$ composed of x0, x2, x4, x6) is shifted rightward by one bit, so that the least significant bit (LSB) of the data to be decoded $(x0\ x2\ x4\ x6)^T$ is taken as the address index value to look up a table and address, and each row of the first coefficient matrix P or second coefficient matrix Q is stored. The bit width of the data to be decoded is 12 bits.

The bit width of the data to be decoded is generally set between 8-10 bits in the prior art. Therefore, in the video decoding process, since the bit width of the data to be decoded is relatively small, data loss occurs in the decoded data obtained from the inverse discrete cosine transform, thereby resulting in that the difference between the display areas having different gray scale values increases. For example, transition from the gray scale level 100 to the gray scale level 101 is not smooth but takes on a straight line. In the embodiment of the present disclosure, the bit width of the data to be decoded is set as 12 bits, so as to increase accuracy of data processing in the decoding process. For example, numeric points used for transition from the gray scale level 100 to the gray scale level 101 can be increased, thereby avoiding data loss from occurring, so as to increase picture softness.

The process of storing each row of the first coefficient matrix P or second coefficient matrix Q is in particular as below. For example, for 4×1 matrix PX1, an intermediate value corresponding to the first row of the first coefficient matrix P is y0=ax0+cx2+ax4+fx6. When the address index value composed of the least significant bit of the data to be decoded, for example $(x0\ x2\ x4\ x6)^T$, is (1000) (wherein each of the least significant bits $(x0[0]\ x2[0]\ x4[0]\ x6[0])^T$ of $(x0\ x2\ x4\ x6)^T$ has 16 possibilities), this intermediate value is y0=ax0+cx2+ax4+fx6=a×1+c×0+a×0+f×0=a. Therefore, it needs to store the above intermediate value according to the address index value (1000). Since a first bit of the storage table used for storing the intermediate value is an address bit, the second position (4'b0001+1) of the storage table stores the intermediate value y0 corresponding to the first row of the first coefficient matrix P. y0 is a complement code equivalent to a in terms of numeric, and its most significant bit is a sign bit. It needs to note that 4'b in the second position (4'b0001+1) represents 4-bit binary number, 0001 thereof is the intermediate value y0', i.e., the complement code equivalent to a in terms of numeric, and +1 thereof is a storage position, i.e., the second position in the table. If the storage position is a third position, then its value is +11, and so on and so forth.

S104: performing distributed computing on the look-up table result PX1 corresponding to the first coefficient matrix P and the look-up table result QX2 corresponding to the second coefficient matrix Q, to obtain decoded data.

In particular, through the above step, it can finish the multiplication operations PX1 and PX2 of multiplying two 4×4 matrixes (the first coefficient matrix P and the second coefficient matrix Q) with the two 4×1 matrixes X1 and X2 respectively. As such, through the distributed computing of Y1=PX1+QX2 and Y2=PX1−QX2, it can obtain the decoded data $(Y1\ Y2)^T$. A clock cycle is used to complete the above distributed computing.

The present application provides a method for decoding a video. The method comprises: storing received data to be decoded in a plurality of first data registers and a plurality of second data registers that are spaced with each other, performing shift and look-up table processing on the data to be decoded that is stored in the first data registers and the second data registers, to obtain look-up table results corresponding to a first coefficient matrix and a second coefficient matrix respectively, and performing distributed computing on the look-up table result corresponding to the first coefficient matrix and the look-up table result corresponding to the second coefficient matrix, to obtain decoded data. As such, the micro architecture of the video decoding algorithm can be simplified through arranging a plurality of first data registers and a plurality of second data registers that are spaced with each other to perform segmentation processing on the received data to be decoded, so as to guarantee high efficiency of decoding process while not reducing accuracy of data processing.

Further, when the non-sign bit of the above data to be decoded for example $(x0\ x2\ x4\ x6)^T$ shifts to the least significant bit LSB, before the above step S104, the method for decoding the video can further comprise: performing accumulation processing on the above look-up table result PX1 or QX2, and arithmetically shifting the accumulation result of the look-up table result rightward by one bit.

It needs to note that, since the most significant bit of the data to be decoded is a sign bit, the above non-sign bit refers to bits other than the most significant bit.

Performing accumulation processing on the look-up table result PX1 or QX2 in particular refers to: in a case of taking $(x0\ x2\ x4\ x6)^T$ or $(x1\ x3\ x5\ x7)^T$ as the address index value to look up a table and address and storing each row of the first coefficient matrix P or the second coefficient matrix Q, for example, it will obtain the intermediate value y0 corresponding to the first row of the first coefficient matrix P or the intermediate value y1 corresponding to the first row of the second coefficient matrix Q. By taking the intermediate value y0 corresponding to the first row of the first coefficient matrix P as an example, since the bit width of the data to be decoded is 12 bits, the process of shifting the non-sign bit of the data to be decoded for example $(x0\ x2\ x4\ x6)^T$ to the least significant bit needs to be performed for 11 times, then the intermediate value y0 corresponding to the first row of the first coefficient matrix P will be generated for 11 times. The embodiment of the present application can arrange a register (for example ROM) configured to store the intermediate value y0. At this time, it needs to accumulate the intermediate values y0 generated by means of shifting and looking up table each time, and the accumulated intermediate values y0 at each time will generate a carry. In consideration of storage capacity and production cost of the register, for example, the bit width of the register can be set as 15 bits (or when high 4 is determined as overflow, the bit width can be set as at least 13 bits). In this way, it needs to shift the accumulation result of the intermediate value y0 rightward at each time (in total 11 times), so that this one bit is lost in the process of shifting right. The above process is called as a shift-accumulation process. This shift-accumulation process needs 11 clock cycles to shift and generate an intermediate value. As such, it can save the bit width of the register configured to store the above intermediate value y0, so as to save the design area for the micro architecture of the decoding algorithm.

Further, when the sign bit (i.e., the most significant bit) of the data to be decoded for example $(x0\ x2\ x4\ x6)^T$ shifts to the least significant bit LSB, after the step of performing accumulation processing on the look-up table PX1 or QX2 and arithmetically shifting the accumulation result of the look-up table result rightward by one bit, the method further comprises: outputting the first shift data corresponding to the first coefficient matrix P and the second shift data corresponding to the second coefficient matrix Q obtained respectively after performing accumulation and right-shift processing on the look-up table result. The first shift data corresponding to the first coefficient matrix P or the second shift data corresponding to the second coefficient matrix Q in particular refers to the intermediate value finally generated through the above shift-accumulation process (shifting and accumulating for 11 times), for example, a final accumulation result of the intermediate value y0 corresponding to the first row of the first coefficient matrix Q or a final accumulation result of the intermediate value y1 corresponding to the first row of the second coefficient matrix Q. It needs one clock cycle to stabilize the first shift data corresponding to the first coefficient matrix P and the second shift data corresponding to the second coefficient matrix Q on the data line, so as to output.

To sum up, the above process needs 8 clock cycles to store the decoded data in the first data registers 1011 (Date0, Date2, Date4, Date6) and the second data registers 1012 (Date1, Date3, Date5, Date7), and at the same time declares a register reg_temp configured to store an intermediate value for example y0 and clears zero. The bit width of the register is 15 bits. Then, it needs to provide one clock cycle for inputting a signal to start computing. Next, 12 clock cycles are used for shift-accumulation computing, and in particular the following command can be executed: reg_temp<={reg_temp[14], reg_temp[14:1]}+T, the intermediate values corresponding to each row of the first coefficient matrix P and the second coefficient matrix Q are accumulated. It can be seen that for each shift, reg_temp[0] is abandoned. Then, it is determined whether to shift to the sign bit of the data to be decoded for example $(x0\ x2\ x4\ x6)^T$ currently, if shifting to the non-sign bit, then shifting the entire of $(x0\ x2\ x4\ x6)^T$ rightward by one bit and repeating the above calculation command, and thus reg_temp continually accumulates. If it is the sign bit, then it indicates that the above process has shifted for 11 times. According to a definition of complement code, the current position has shifted to the sign bit. The current cycle executes the following command: reg_temp<={reg_temp[14], reg_temp[14:1]}−T. Due to having already shifted to the sign bit, reg_temp that is stabilized on the data line in the next clock cycle is the final result, for example, the final accumulation result of the intermediate values y0 corresponding to the first row of the first coefficient matrix P. In the same way, the final accumulation result of y1~y7 can be obtained, so as to obtain the first shift data corresponding to the first coefficient matrix P and the second shift data corresponding to the second coefficient matrix Q.

Since the shift-accumulation process of 12 cycles described above can be performed while the decoded data is stored, one clock cycle can be saved. Finally, it needs one clock cycle to complete the above distributed computing to obtain the decoded data $(Y1\ Y2)^T$. Therefore, 8+12+1=21 cycles are needed to complete an inverse discrete cosine transform of 8 bits for one time to obtain the decoded data $(Y1\ Y2)^T$.

Further, in the case of performing the above shift-accumulation process, in the process of shifting the non-sign bit of the data to be decoded having a bit width of 12 bits for example $(x0\ x2\ x4\ x6)^T$ to the least significant bit LSB, right-shift is performed for total 11 times, and thus it needs to compensate the above 11 times of shifting right.

Therefore, preferably, the above method for decoding the video can further comprise: shifting the first shift data or the second shift data leftward by 6 bits.

In particular, by taking the final accumulation result of the intermediate values y0 corresponding to the first row of the first coefficient matrix P, i.e., the first shift data, as an example, when the first shift data is:

$$y0 = ax0 + cx2 + ax4 + fx6 = a \times 1 + c \times 0 + a \times 0 + f \times 0 = a;$$

$$a = \frac{1}{2}\cos\frac{\pi}{4} = 0.70700$$

after being shifted leftward by 6 bits, it is 70711 and is rounded as 22, and the binary representation thereof is 10110, thereby corresponding to the second column from the left of the storage stable used for storing the first shift data. Six bits by which the addressing parameter shifts rightward can be compensated in the process of shifting and looking up table. Through the above process of shifting left, it can further avoid calculation error caused by a direct calculation of fixed-point fractions for example 0.70700 and the inverse discrete cosine integer coefficient in the process of inverse discrete cosine transform.

Further, in order to continuously compensate 11 bits shifted rightward in the shift-accumulation process, the method for decoding the video can further comprise: compensating at least one 0 at right end of the numeric of the first shift data or the second shift data according to the storage position of the first shift data or the second shift data. The number of 0 matches with the storage position of the first shift data or the second shift data.

In particular, by still taking the final accumulation result of the intermediate values y0 corresponding to the first row of the first coefficient matrix P, the first shift data, as an example, when the first shift data is:

$$y0 = ax0 + cx2 + ax4 + fx6 = a \times 1 + c \times 0 + a \times 0 + f \times 0 = a;$$

$$a = \frac{1}{2}\cos\frac{\pi}{4} = 0.70700$$

According to a=0.70700, the obtained binary number is 10110, which is stored in the second column from the left of the storage table used for storing the first shift data. Therefore, after 10110 is taken out, five 0s are added subsequence to 10110, thereby obtaining 1011000000, then the 1011000000 is stored. When it is stored in the third column, four 0s are added subsequent thereto. Other storage positions are not illustrated by examples herein. As such, through the above method, 11 bits shifted rightward in the shift-accumulation process can be compensated.

The above is description of the method for decoding the video that adopts one-dimensional inverse discrete cosine transform. In the actual decoding process, in order to obtain a picture having better display effect, it needs to construct a two-dimensional IDCT by the one-dimensional IDCT, so that the decoder performs a deep decoding on the input data to be decoded.

Figure 3:
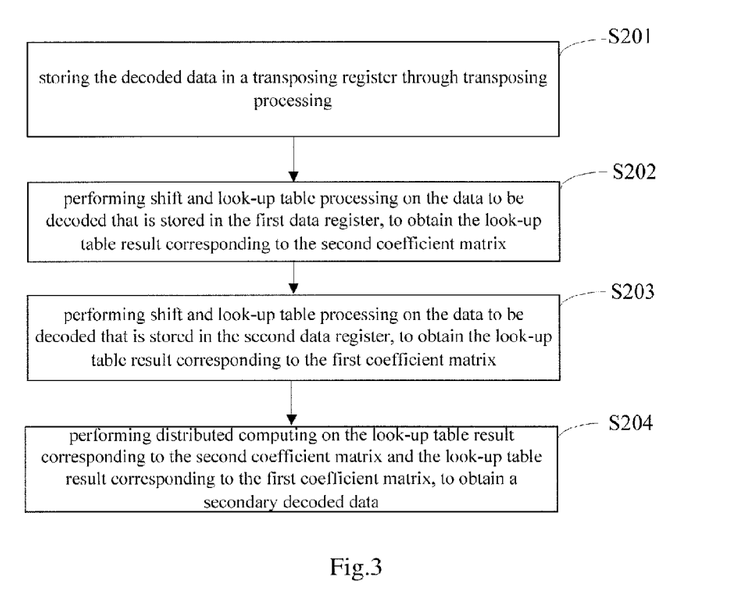
FIG. 3 is a flow chart of another method for decoding a video provided in an embodiment of the present application.

Therefore, preferably, as shown in FIG. 3, the method for decoding the video further comprises following respective steps.

S201: storing the decoded data in a transposing register through transposing processing.

Figure 4:
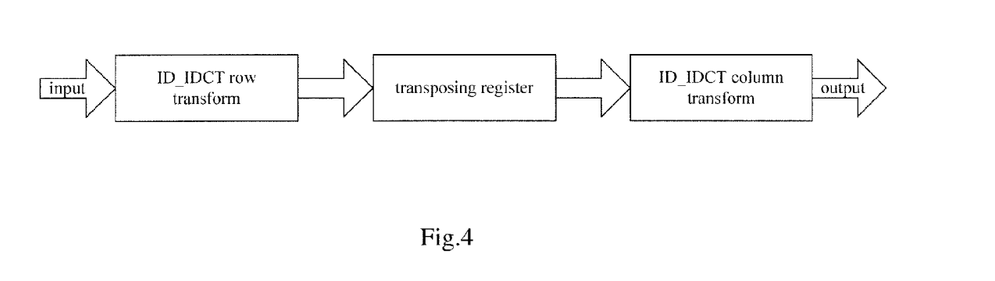
FIG. 4 is a schematic diagram of a two-dimensional inverse discrete cosine transform method provided in an embodiment of the present application.

Since the two-dimensional IDCT has a large amount of computing, for example, in order to directly perform the two-dimensional IDTC on a calculation module having a size of 8×8, it needs to perform multiplication operation for 8192 times and perform addition operation for 3584 times. Therefore, the two-dimensional IDCT can be completed through two times of one-dimensional IDCT (ID_IDCT). A typical two-dimensional IDCT processing process is as illustrated in FIG. 4. It can obtain the decoded data by performing the first time of one-dimensional IDCT process (ID_IDCT row transform):

$$\begin{pmatrix} Y1 \\ Y2 \end{pmatrix} = IDCT \begin{pmatrix} X1 \\ X2 \end{pmatrix}$$

Therefore, it can calculate and obtain the following formula by performing next one-dimensional IDCT (ID_IDCT column transform):

$$\begin{pmatrix} Y1 \\ Y2 \end{pmatrix} = IDCT \begin{pmatrix} X2 \\ X1 \end{pmatrix}$$

Before that, it needs to complete calculation of one complete row of the decoded data $(Y1\ Y2)^T$ through one-dimensional IDCT (ID_IDCT column transform). Therefore, the intermediate result obtained from the calculation of the complete row needs to be buffered in the transposing register.

S202: performing shift and look-up table processing on the data to be decoded (the matrix $(x0\ x2\ x4\ x6)^T$ composed of x0, x2, x4, x6) stored in the first data register 1011 (Date0, Date2, Date4, Date6), to obtain the look-up table result QX1 corresponding to the second coefficient matrix Q.

S203: performing shift and look-up table processing on the data to be decoded (the matrix $(x1\ x3\ x5\ x7)^T$ composed of x1, x3, x5, x7) stored in the second data register 1012 (Date1, Date3, Date5, Date7), to obtain the look-up table result PX2 corresponding to the first coefficient matrix P.

It needs to note that the above steps S202 and S203 are in no particular order, and can be performed simultaneously.

In particular, the above shift and look-up table processing is described as below. looking up table and addressing are performed by taking $(x0\ x2\ x4\ x6)^T$ or $(x1\ x3\ x5\ x7)^T$ as the address index value, and each row of the second coefficient matrix Q or the first coefficient matrix P is stored, so as to obtain the look-up table result QX1 corresponding to the second coefficient matrix Q or the look-up table result PX2 corresponding to the first coefficient matrix P. Each row of the second coefficient matrix Q and first coefficient matrix P corresponds to an intermediate value. For example, the first row of the second coefficient matrix Q corresponds to the intermediate value y0, and the first row of the first coefficient matrix P corresponds to the intermediate value y1. The correspondence relationship of other rows is analogized on such a basis.

S204: performing distributed computing on the look-up table result QX1 corresponding to the second coefficient matrix Q and the look-up table result PX2 corresponding to the first coefficient matrix P, to obtain a secondary decoded data:

$$\begin{pmatrix} Y1 \\ Y2 \end{pmatrix} = IDCT \begin{pmatrix} X2 \\ X1 \end{pmatrix}.$$

Figure 5:
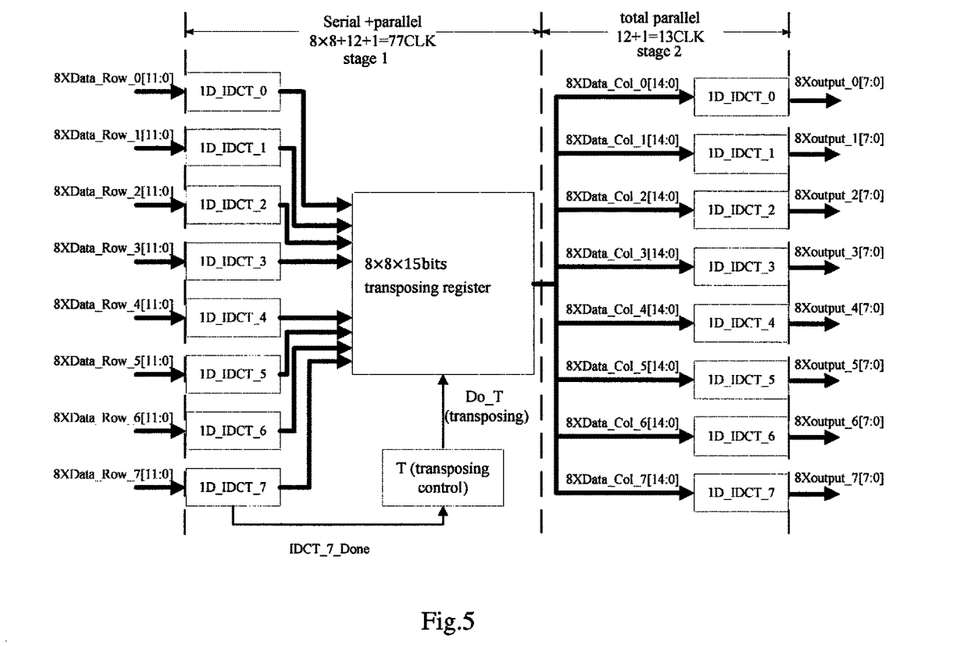
FIG. 5 is a schematic diagram of a structure of micro architecture of a two-dimensional inverse discrete cosine transform provided in an embodiment of the present application.
Figure 6:
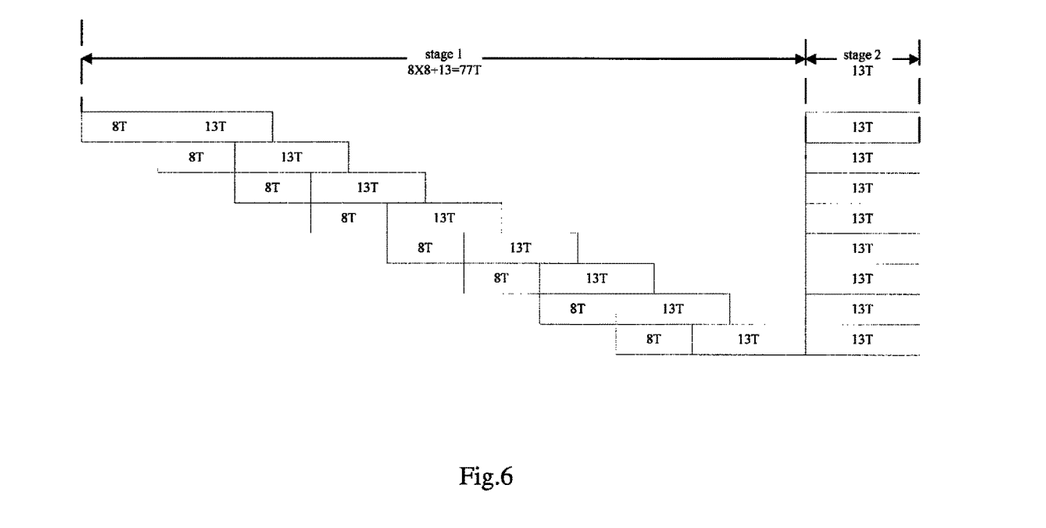
FIG. 6 is a timing control diagram of a two-dimensional inverse discrete cosine transform provided in an embodiment of the present application.

As shown in FIG. 5, for the computing module of 8×8, in the process of the first time of one-dimensional IDCT (i.e, ID_IDCT row transform), i.e., stage 1 as shown in FIG. 6. Since all data in the decoding chain is transmitted in a serial mode, the computing unit must wait before the matrix $(x0\ x2\ x4\ x6)^T$ composed of the data to be decoded (x0, x2, x4, x6) is stored. Therefore, the data has both the serial mode and the parallel mode in the stage 1, wherein [11:0] in FIG. 5 represents that the input data is a 12-bit binary number, [14:0] represents that the input data is a 15-bit binary number, and [7:0] represents that the input data is an 8-bit binary number.

In particular, the process that the computing module of 8×8 stores the data to be decoded (x0~x7) needs 8×8=64 clock cycles; while in the process of storing each row of the second coefficient matrix Q or first coefficient matrix P by taking $(x0\ x2\ x4\ x6)^T$ or $(x1\ x3\ x5\ x7)^T$ as the address index value to look up a table and address so as to obtain the look-up table result QX1 corresponding to the second coefficient matrix Q or the look-up table PX2 corresponding to the first coefficient matrix P, i.e., the shift-accumulation process, 13 clock cycles are required as described above. Therefore, as shown in FIG. 6, the process in stage 1 requires 8×8+13=77 clock cycles.

After transposing the result of the above first time of one-dimensional IDCT through the transposing register, in the second time of one-dimensional IDCT (ID_IDCT column transform), i.e., in stage 2, it can enable the data to be completely processed in the parallel mode in the shift-accumulation process. Therefore, it only needs 13 clock cycles to obtain the secondary decoded data.

As such, it can be seen from FIG. 5 that total 16 one-dimensional IDCT computing modules are used in the two-dimensional IDCT computing architecture, wherein the first 8 of the 16 one-dimensional IDCT computing modules are used to perform the first time of one-dimensional IDCT process (ID_IDCT row transform), one of the 16 one-dimensional IDCT computing modules is used to transpose the calculation result of the first time of one-dimensional IDCT, and the last 7 of the 16 one-dimensional IDCT computing modules are used to perform the second time of one-dimensional IDCT (ID_IDCT column transform). And this two-dimensional IDCT computing has a large margin in terms of timing. In the case of inputting the decoded data in the serial mode, only 90 (77+13) clock cycles are used. In addition, even if additional 64 data is immediately followed by a completion of 64 frequency domain data shifting, the above architecture will smoothly processed. Because at this time, ID_IDCT_0~ID_IDCT_7 in the computing unit will sequentially in idle according to the timing result, the next round of data processing can be performed immediately. Therefore, the method for decoding a video in the two-dimensional IDCT in the embodiment of the present application is implemented by controlling and multiplexing the one-dimensional IDCT computing method based on the shift-accumulation computing as well as the first coefficient matrix P and the second coefficient matrix Q, and is able to expand the bit width of the data to be decoded from 8 bits or 10 bit to 12 bits for the serial protocol, so as to increase the accuracy of data processing while improving the efficiency of decoding.

Figure 7:
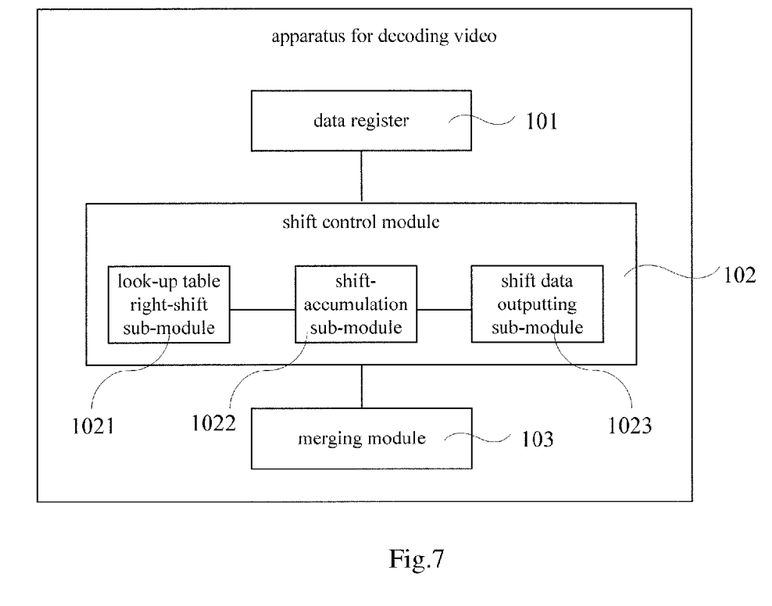
FIG. 7 is a schematic diagram of a structure of an apparatus for decoding a video provided in an embodiment of the present application.

The embodiment of the present application provides an apparatus for decoding a video. As shown in FIG. 7, the apparatus for decoding the video comprises a data register 101, a shift control module 102 and a merging module 103.

The data register 101 is configured to store the received data to be decoded (x0, x1 . . . x7) in sequence. As shown in FIG. 2, the data register 101 comprises a plurality of first data registers 1011 (Date0, Date2, Date4, Date6) and a plurality of second data registers 1012 (Date1, Date3, Date5, Date7) that are spaced with each other.

In the formula of Y1=PX1+QX2 and Y2=PX1−QX2, there are same computing unit modes, i.e., 4×1 matrix PX1 and 4×1 matrix QX2. Therefore, segmentation processing can be performed on the received data to be decoded (x0, x1 . . . x7) by arranging the plurality of first data registers 1011 (Date0, Date2, Date4, Date6) and the plurality of second data registers 1012 (Date1, Date3, Date5, Date7) that are spaced with each other, so as to calculate the above 4×1 matrix PX1 and 4×1 matrix QX2 through subsequent steps, and calculate Y1 and Y2 through multiplication and addition operations. Correspondingly, it can simplify the above inverse discrete cosine transform processing. Of course, the above division of the data registers 101 is just for illustration, and thus there are other division modes. For example, the data registers 101 may be divided into four types of registers, for example, first data registers (Date0, Date2), second data registers (Date4, Date6), third data registers (Date1, Date3) and fourth registers (Date5, Date7). Those skilled n the art can divide the data registers 101 according to the actual requirement for computing efficiency and computing accuracy. Other kinds of division in the embodiment of the present application are not described in detail herein.

The shift control module 102 performs shift and look-up table processing on the data to be decoded (matrix (x0 x2 x4 x6)$^T$ composed of x0, x2, x4, x6) that is stored in the first data registers 1011 (Date0, Date2, Date4, Date6) or the data to be decoded (matrix (x1 x3 x5 x7)$^T$ composed of x1, x3, x5, x7) that is stored in the second data registers 1012 (Date1, Date3, Date5, Date7), to obtain the look-up table result PX1 corresponding to the first coefficient matrix P or the look-up table result QX2 corresponding to the second coefficient matrix Q.

In particular, the above shift and look-up table processing is specified as follows: looking up table and addressing are performed by taking (x0 x2 x4 x6)$^T$ or (x1 x3 x5 x7)$^1$ as the address index value, and each row of the first coefficient matrix P or the second coefficient matrix Q are stored, so as to obtain the look-up table result PX1 corresponding to the first coefficient matrix P or the look-up table result QX2 corresponding to the second coefficient matrix Q. Each row of the first coefficient matrix P and second coefficient matrix Q corresponds to one intermediate value. For example, the first row of the first coefficient matrix P corresponds to the intermediate value y0, and the first row of the second coefficient matrix Q corresponds to the intermediate value y1. The correspondence relationship of other rows is analogized on such a basis.

Preferably, numeric (a, b, c, d, e, f, g) of the first coefficient matrix P or the second coefficient matrix Q is set as signed number having 8 bits. The most significant bit of the signed number having 8 bits is the sign bit.

In the process of performing shift and look-up table processing by the apparatus for decoding the video, preferably, the shift control module 102 further comprises a look-up table right-shift sub-module 1021. The data to be decoded (for example, the matrix (x0 x2 x4 x6)$^T$ composed of x0, x2, x4, x6) is shifted rightward by one bit by the look-up table right-shift sub-module 1021, so that the least significant bit (LSB) of the data to be (x0 x2 x4 x6)$^T$ decoded is taken as the address index value to look up the table and make address. Each row of the first coefficient matrix P or second coefficient matrix Q are stored. The bit width of the data to be decoded may be 12 bits.

In the prior art, the bit width of the data to be decoded that can be processed by the apparatus for decoding the video is generally set between 8-10 bits. Since the data to be decoded has a relatively small bit width, it causes that data loss occurs in the decoded data obtained by the apparatus for decoding the video, which results in that the difference between the display areas having different gray scale values increases. For example, transition from the gray scale level 100 to the gray scale level 101 is not smooth and takes on a straight line. The bit width of the data to be decoded that can be processed by the apparatus for decoding the video provided in the embodiment of the present application is set as 12 bits, so as to increase accuracy of data processing in the decoding process. For example, numeric points used for transition from the gray scale level 100 to the gray scale level 101 can be increased, thereby avoiding data loss from occurring, so as to increase picture softness.

The merging module 103 performs distributed computing on the look-up table result PX1 corresponding to the first coefficient matrix P and the look-up table result QX2 corresponding to the second coefficient matrix Q, to obtain decoded data.

In particular, the merging module 103 is able to complete the multiplication operations PX1 and PX2 of two 4×4 matrixes (the first coefficient matrix P and the second coefficient matrix Q) with the two 4×1 matrixes X1 and X2 respectively. As such, through the distributed computing of Y1=PX1+QX2 it Y2=PX1−QX2, can obtain the decoded data (Y1 Y2)$^T$.

The present application provides an apparatus for decoding a video. The apparatus comprises the date register, the shift control module, and the merging module. The date register is configured to store received data to be decoded in a plurality of first data registers and a plurality of second data registers that are spaced with each other. The shift control module is configured to perform shift and look-up table processing on the data to be decoded that is stored in the first data registers and the second data registers, to obtain look-up table results corresponding to a first coefficient matrix and a second coefficient matrix respectively. The merging module is configured to perform a distributed computing on the look-up table result corresponding to the first coefficient matrix and the look-up table result corresponding to the second coefficient matrix, to obtain decoded data. As such, segmentation processing can be performed on the received data to be decoded through arranging a plurality of first data registers and a plurality of second data registers that are spaced with each other, which is capable of simplifying the micro architecture of the video decoding algorithm, so as to guarantee high efficiency of decoding process while not reducing accuracy of data processing.

Further, when the apparatus for decoding the video can perform two-dimensional IDCT computing on the received data to be decoded. As show in FIG. 8, the apparatus for decoding the video further comprises a transposing module 201, a transposing register 202, a secondary shift control module 293 and a secondary merging module 204.

Figure 8:
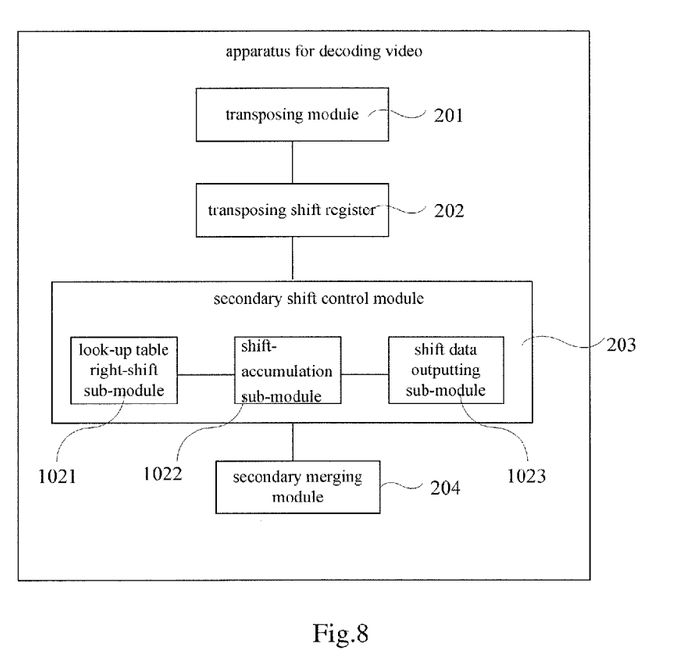
FIG. 8 is a schematic diagram of a structure of another apparatus for decoding a video provided in an embodiment of the present application.

The transposing module 201 performs transposing processing on the decoded data from the merging module 103.

Since the two-dimensional IDCT has a large amount of computing. For example, if the two-dimensional IDCT is directly performed on a calculation module having a size of 8×8, it needs to perform multiplication operation for 8192 times and addition operation for 3584 times. Therefore, the two-dimensional IDCT can be done through two times of one-dimensional IDCT (ID_IDCT). A typical two-dimensional IDCT processing process is as shown in FIG. 4. The first time of one-dimensional IDCT process is ID_IDCT row transform, and the second time of one-dimensional IDCT process is ID_IDCT column transform. Therefore, after calculation of a complete row of the decoded data (Y1 Y2)' is completed in the first time of one-dimensional IDCT process, it needs to transpose the intermediate result obtained from the calculation of the above complete row, so as to perform the second time of one-dimensional IDCT process (ID_IDCT column transform).

The transposing register 202 stores the processing result of the transposing module 201, i.e., the intermediate result obtained from calculating a complete row of the decoded data $(Y1\ Y2)^T$ in the first time of one-dimensional IDCT process.

The secondary shift control module 203 performs shift and look-up table processing on the data to be decoded (the matrix $(x0\ x2\ x4\ x6)^T$ composed of x0, x2, x4, x6) stored in the first data register 1011, to obtain the look-up table result QX1 corresponding to the second coefficient matrix Q, or performs shift and look-up table processing on the data to be decoded (the matrix (x1 x3 x5 x7) composed of x1, x3, x5, x7) stored in the second data register 1012, to obtain the look-up table result PX2 corresponding to the first coefficient matrix P.

In particular, the above process that the secondary shift control module 203 performs shift and look-up table processing is specified as follows: looking up a table and addressing by taking (x0 x2 x4 x6)' or $(x1\ x3\ x5\ x7)^T$ as an address index value, and storing each row of the first coefficient matrix P or the second coefficient matrix Q, so as to obtain the look-up table result QX1 corresponding to the second coefficient matrix Q or the look-up table result PX2 corresponding to the first coefficient matrix P. Each row of the second coefficient matrix Q and first coefficient matrix P corresponds to one intermediate value. For example, the first row of the second coefficient matrix corresponds to the intermediate value y0, and the first row of the first coefficient matrix P corresponds to the intermediate value y1. The correspondence relationship of other rows is analogized on such a basis.

The secondary merging module 204 performs distributed computing on the look-up table result QX1 corresponding to the second coefficient matrix Q and the look-up table result PX2 corresponding to the first coefficient matrix P, to obtain the secondary decoded data:

$$\begin{pmatrix} Y1 \\ Y2 \end{pmatrix} = IDCT \begin{pmatrix} X2 \\ X1 \end{pmatrix}.$$

Further, the shift control module 102 or the secondary shift control module 203 can further comprise a shift-accumulation sub-module 1022.

The shift-accumulation sub-module 1022 is configured to perform accumulation processing on the look-up table result when the non-sign bit of the data to be decoded for example $(x0\ x2\ x4\ x6)^T$ shifts to the least significant bit LSB, and arithmetically shifts the accumulation result of the look-up table result rightward by one bit.

The process of performing accumulation processing on the look-up table result by the shift-accumulation sub-module 1022 in particular refers to: in a case of looking up a table and addressing by taking $(x0\ x2\ x4\ x6)^T$ or $(x1\ x3\ x5\ x7)^T$ as the address index value and storing each row of the first coefficient matrix P or the second coefficient matrix Q, for example, it will obtain the intermediate value y0 corresponding to the first row of the first coefficient matrix P or the intermediate value y1 corresponding to the first row of the second coefficient matrix Q. By taking the intermediate value y0 corresponding to the first row of the first coefficient matrix P as an example, since the bit width of the data to be decoded is 12 bits, the process of shifting the non-sign bit of the data to be decoded for example $(x0\ x2\ x4\ x6)^T$ to the least significant bit needs to be performed for 11 times, then the intermediate value y0 corresponding to the first row of the first coefficient matrix P will be generated for 11 times. The embodiment of the present application can arrange a register (for example ROM) configured to store the intermediate value y0. At this time, it needs to accumulate the intermediate values y0 generated through shifting and looking up table, and the accumulated intermediate values at each time will generate a carry. In consideration of storage capacity and production cost of the register, for example, the bit width of the register can be set as 15 bits (or high 4 is determined as overflow, the bit width can be set as at least 13 bits). In this way, it needs to shift the accumulation result of the intermediate value y0 rightward at each time (for total 11 times), so that this one bit is lost in the process of shifting right. The above process is called as a shift-accumulation process. This shift-accumulation process needs 11 clock cycles to shift and generate an intermediate value. As such, it can save the bit width of the register configured to store the above intermediate value y0, so as to save a design area for the micro architecture of decoding algorithm.

Further, the above shift control module 102 or the secondary shift control module 203 can further comprise a shift data outputting sub-module 1023.

The shift data outputting sub-module 1023 is configured to output a first shift data corresponding to the first coefficient matrix P and a second shift data corresponding to the second coefficient matrix Q obtained respectively after performing accumulation and right-shift processing on the look-up table result PX2 or QX1 when the sign bit of the data to be decoded for example $(x0\ x2\ x4\ x6)^T$ shifts to the least significant bit LSB. The first shift data corresponding to the first coefficient matrix P and the second shift data corresponding to the second coefficient matrix Q in particular refers to an intermediate value finally generated through the above shift-accumulation processing (shifting and accumulating for 11 times), for example, a final accumulation result of the intermediate value y0 corresponding to the first row of the first coefficient matrix Q or a final accumulation result of the intermediate value y1 corresponding to the first row of the second coefficient matrix Q. It needs one clock cycle to stabilize the first shift data corresponding to the first coefficient matrix P and the second shift data corresponding to the second coefficient matrix Q on the data line, so as to output.

Figure 9:
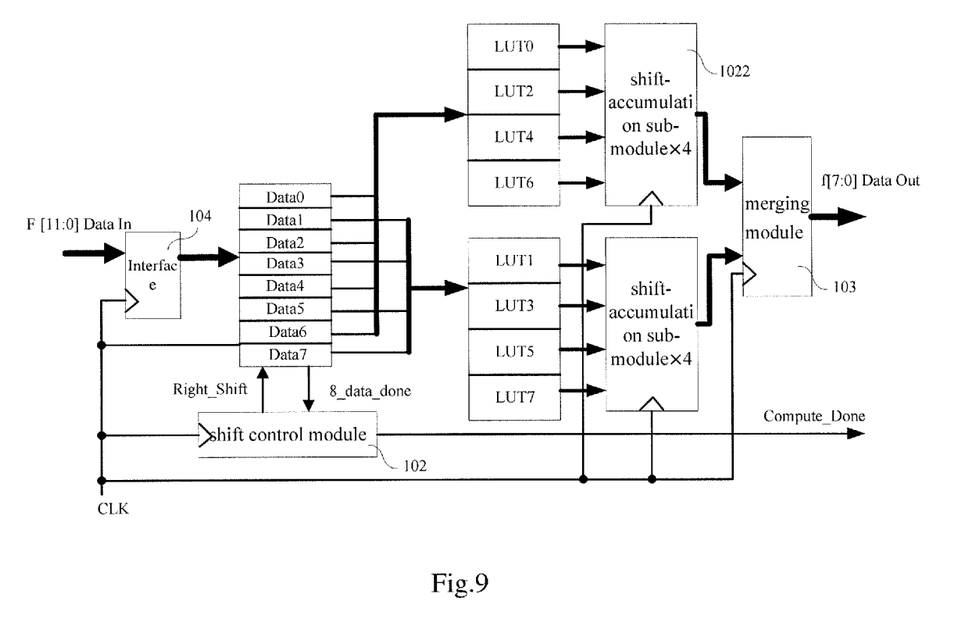
FIG. 9 is a schematic diagram of a structure of micro architecture of a one-dimensional inverse discrete cosine transform provided in an embodiment of the present application.

The method for decoding a video that is implemented by adopting the one-dimensional IDCT micro architecture will be described below with reference to FIG. 9.

Figure 10:
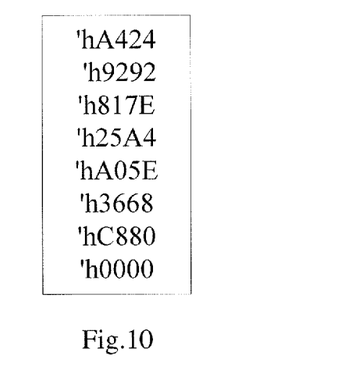
FIG. 10 is a schematic diagram of storage of an IDCT coefficient storage table provide in an embodiment of the present application.

Firstly, the data to be decoded (x0, x1 . . . x7) are stored in sequence in the plurality of first data registers 1011 (Date0, Date2, Date4, Date6) and the plurality of second data registers 1012 (Date1, Date3, Date5, Date7) that are spaced with each other through an interface 104. At this time, a signal b_date_done is pulled up. Then, the position of the shift control module 102 is Right_Shift signal, the data register 101 (Date0~Date7) shifts rightward by one bit in rise stage of each clock (CLK), and the signal Right_Shift is reset until the most significant sign bit shifts to the least significant bit LSB. A computing completion signal Compute_Done (having a width of one clock) is output at a next clock. Next, looking up able and addressing are performed by taking the decoded data (x0, x1 . . . x7) as the address index value, and each row of the first coefficient matrix P or the second coefficient matrix Q is stored in the IDCT coefficient storage stable (LUT0~LUT7). The IDCT coefficient storage stable is for example as shown in FIG. 10. "h" in the table represents that the stored data is a 16 binary number, and letters and numerals behind "h" represent a true value of the numeric of each row of the stored first coefficient matrix P or second coefficient matrix Q. In the case of calculating an intermediate value corresponding to each row of the first coefficient matrix P and second coefficient matrix Q by meaning of looking up table, for example, the intermediate value y0 corresponding to the first row of the first coefficient matrix P, and the intermediate value y1 corresponding to the first row of the second coefficient matrix Q, shift and accumulation processing are performed on the above intermediate values through 8 shift-accumulation sub-modules 1022 under the control of the shift control module 102, thereby finally obtaining the look-up table result PX1 corresponding to the first coefficient matrix P or the look-up table result QX2 corresponding to the second coefficient matrix Q. Finally, the merging module 103 construct the final result according to the formulas of Y1=PX1+QX2 and Y2=PX1−QX2. In particular, it can symmetrically perform addition operation or subtraction operation on the look-up table result PX1 corresponding to the first coefficient matrix P or the look-up table result QX2 corresponding to the second coefficient matrix Q according to difference of f[7:0] sequence number, and can complete saturation (preventing data from overflowing) processing. Accordingly, the micro architecture used for the inverse discrete cosine transform operation can be simplified, so as to improve efficiency of video decoding. Furthermore, this method for decoding a video is capable of processing the data to be decoded having a bit width of 12 bits, thereby increasing accuracy of processing the video decoded data.

Those skilled in the art can understand that all or part of steps that implement the above method embodiments can be realized by program instruction related hardware. The program can be stored in a computer readable storage medium. The program performs the steps comprising the above method embodiment when being executed. The storage medium comprises various media that can store program codes such as ROM, RAM, disk or optical disk and so on.

The above descriptions are just specific embodiment of the present application. However, the scope sought for protection in the present application is not limited thereto. Any modification or replacement within the technical scope disclosed in the present application easily conceived by those skilled in the art who are familiar with the technical field should be considered as falling into the protection scope of the present application. Therefore, the scope sought for protection by the present application should be subject to the scope sought for protection in the Claims.

The present application claims the priority of Chinese Patent Application No. 201410081093.5 filed on Mar. 6, 2014, entire content of which is incorporated as part of the present invention by reference.

What is claimed is:

1. A method for decoding a video, comprising:
   storing received data to be decoded in a data register in sequence, the data register including a plurality of first data registers and a plurality of second data registers that are spaced with each other;
   performing shift and look-up table processing on the data to be decoded that is stored in the first data registers, to obtain a look-up table result corresponding to a first coefficient matrix;
   performing a shift and look-up table processing on the data to be decoded that is stored in the second data registers, to obtain a look-up table result corresponding to a second coefficient matrix; and
   performing a distributed computing on the look-up table result corresponding to the first coefficient matrix and the look-up table result corresponding to the second coefficient matrix, to obtain decoded data;
   wherein step of the shift and look-up table processing comprises:
   shifting the data to be decoded rightward by one bit, so that the least significant bit of the data to be decoded is taken as an address index value to look up a table and address, wherein a bit width of the data to be decoded is 12 bits.

2. The method for decoding the video according to claim 1, further comprising:
   storing the decoded data in a transposing register through transposing processing:
   performing shift and look-up table processing on the data to be decoded that is stored in the first data register, to obtain the look-up table result corresponding to the second coefficient matrix;
   performing shift and look-up table processing on the data to be decoded that is stored in the second data register, to obtain the look-up table result corresponding to the first coefficient matrix; and
   performing distributed computing on the look-up table result corresponding to the second coefficient matrix and the look-up table result corresponding to the first coefficient matrix, to obtain a secondary decoded data.

3. The method for decoding the video according to claim 1, wherein when a non-sign bit of the data to be decoded shifts to the least significant bit, before the step of performing distributed computing on the look-up table result corresponding to the first coefficient matrix and the look-up table result corresponding to the second coefficient matrix to obtain decoded data, further comprising:

performing accumulation processing on the look-up result and arithmetically shifting an accumulation result of the look-up table result rightward by one bit.

4. The method for decoding the video according to claim 3, wherein when a sign bit of the data to be decoded shifts to the least significant bit, after the step of performing accumulation processing on the look-up table result and arithmetically shifting the accumulation result of the look-up table result rightward by one bit, further comprising:

outputting a first shift data corresponding to the first coefficient matrix and a second shift data corresponding to the second coefficient matrix obtained respectively after performing accumulation and right-shift processing on the look-up table result.

5. The method for decoding the video according to claim 4, further comprising: shifting the first shift data or the second shift data by 6 bits leftward.

6. The method for decoding the video according to claim 5, further comprising:

adding at least one 0 at right end of a numeric of the first shift data or the second shift data according to a storage position of the first shift data or the second shift data;

wherein a number of 0 matches with the storage position of the first shift data or the second shift data.

7. An apparatus for decoding a video, comprising:

a data register configured to store received data to be decoded in sequence, the data register including a plurality of first data registers and a plurality of second data registers that are spaced with each other; and a decoder configured to perform shift and look-up table processing on the data to be decoded that is stored in the first data registers or the data to be decoded that is stored in the second data registers, to obtain a look-up table result corresponding to a first coefficient matrix or a look-up table result corresponding to a second coefficient matrix, and to perform a distributed computing on the look-up table result corresponding to a first coefficient matrix and the look-up table result corresponding to a second coefficient matrix, to obtain decoded data;

wherein the decoder is further configured to shift the data to be decoded rightward by one bit, so that the least significant bit of the data to be decoded is taken as an address index value to look up a table and address, wherein a bit width of the data to be decoded is 12 bits.

8. The apparatus for decoding the video according to claim 7, further comprising:

a transposing register configured to store the decoded data in a transposing register through transposing processing;

wherein the decoder is further configured to perform shift and look-up table processing on the data to be decoded that is stored in the first data register or the data to be decoded that is stored in the second data register, to obtain the look-up table result corresponding to the second coefficient matrix or the look-up table result corresponding to the first coefficient matrix, and to perform distributed computing on the look-up table result corresponding to the second coefficient matrix and the look-up table result corresponding to the first coefficient matrix, to obtain a secondary decoded data.

9. The apparatus for decoding the video according to claim 7, wherein the decoder is further configured to perform accumulation processing on the look-up table result when a non-sign bit of the data to be decoded shifts to the least significant bit and arithmetically shift the accumulation result of the look-up table result rightward by one bit.

10. The apparatus for decoding the video according to claim 9, wherein the decoder is further configured to output a first shift data corresponding to the first coefficient matrix and a second shift data corresponding to the second coefficient matrix obtained respectively after performing accumulation and shifting rightward processing on the look-up table result when the sign bit of the data to be decoded shifts to the least significant bit.

* * * * *